Figure 1:
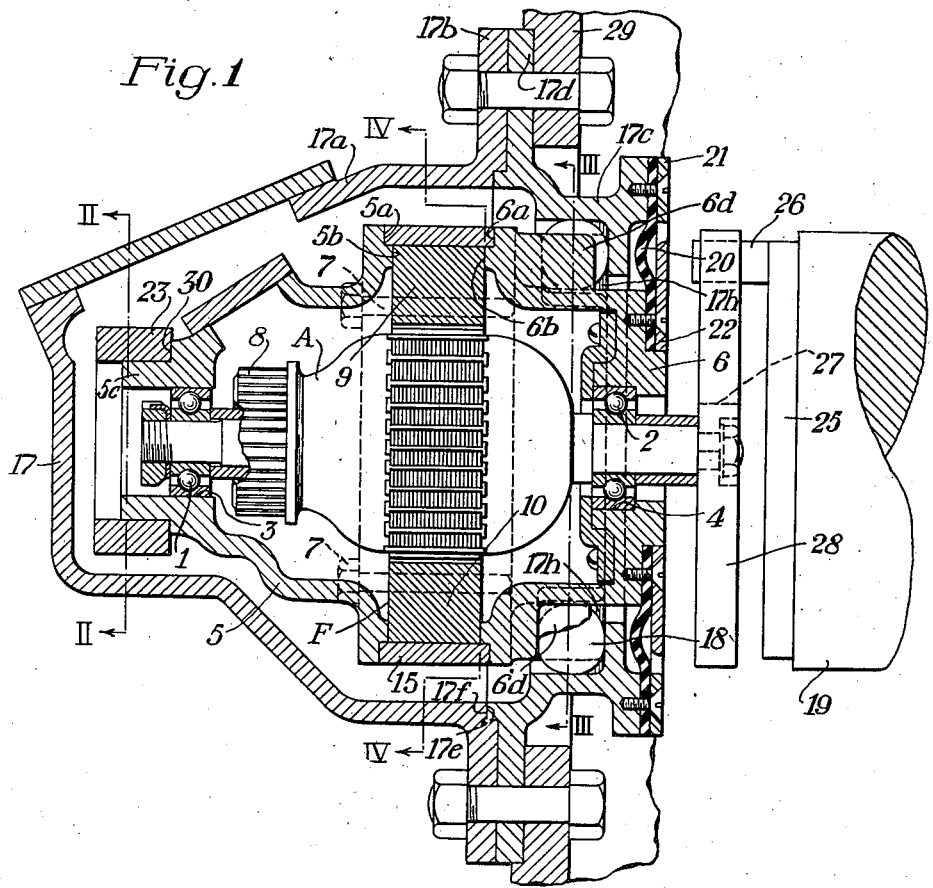

March 30, 1943. J. W. LIVINGSTON 2,315,065
DYNAMO-ELECTRIC MACHINE AND MOUNTING MEANS THEREFOR
Filed June 19, 1941 2 Sheets-Sheet 1

INVENTOR
John W. Livingston
BY
HIS ATTORNEY

March 30, 1943.　　　J. W. LIVINGSTON　　　2,315,065
DYNAMO-ELECTRIC MACHINE AND MOUNTING MEANS THEREFOR
Filed June 19, 1941　　　2 Sheets-Sheet 2

INVENTOR
John W. Livingston
BY
HIS ATTORNEY

Patented Mar. 30, 1943

2,315,065

UNITED STATES PATENT OFFICE 2,315,065

DYNAMOELECTRIC MACHINE AND MOUNTING MEANS THEREFOR

John W. Livingston, Forest Hills, Pa., assignor to The Union Switch & Signal Company, Swissvale, Pa., a corporation of Pennsylvania Application June 19, 1941, Serial No. 398,784

3 Claims. (Cl. 105—96.1)

My invention relates to dynamo-electric machines, and particularly to generators which are intended to be mounted on the journal boxes and driven from the axles of cars or locomotives which are in high speed service, for indicating or controlling the speed of the cars or locomotives, for controlling the braking ratio, or the like.

As is well known, the axles of cars and locomotives have at least a limited amount of movement vertically, horizontally and axially relative to the journal boxes, and as a result in order to satisfactorily drive from an axle any form of device which is mounted on a journal box it is necessary to employ a transmission mechanism which will allow for the relative movement between the journal box and the axle. Substantially all forms of transmission mechanisms which will allow for the necessary relative movement between a journal box and an axle employ universal joints, and it is essential for the best operation of these mechanisms that the driven device should be mounted as nearly as possible in axial alignment with the associated axle when the axle occupies its normal position relative to the journal box.

It is also well known that any device which is mounted on the journal box of a high speed train is subjected to considerable shock and vibration which will cause undesirable wear unless suitable means are provided to absorb the shock and vibration.

One object of my invention is to provide an improved mounting means for a generator of the type described which mounting means cushions the generator against damaging shock and vibration, and which at the same time serves to automatically accurately locate the generator in the position in which its armature aligns axially with the axle when the latter is in its normal position relative to the journal box.

According to my invention, the generator is disposed with clearance within an outer housing which is secured to the axle journal box. This housing is provided with projections which cooperate with other projections on the generator end bells to form pockets which are roughly cubical in form. Balls or spheres of high quality rubber possessing long life and a high degree of resiliency are disposed in these pockets under an initial load which is low enough so that the balls do not distort sufficiently to completely fill the pockets. Consequently, when the load on the balls is increased, due for example to vibration, these balls distort and thus absorb the vibration, the maximum permissible distortion being that required to fill the pockets. The pockets and balls are so disposed that movement of the generator within the housing in any direction is limited by the balls.

Other objects and characteristic features of my invention will become apparent as the description proceeds.

I shall describe one form of generator provided with one form of mounting means embodying my invention, and shall then point out the novel features thereof in claims.

Figures 2, 5:
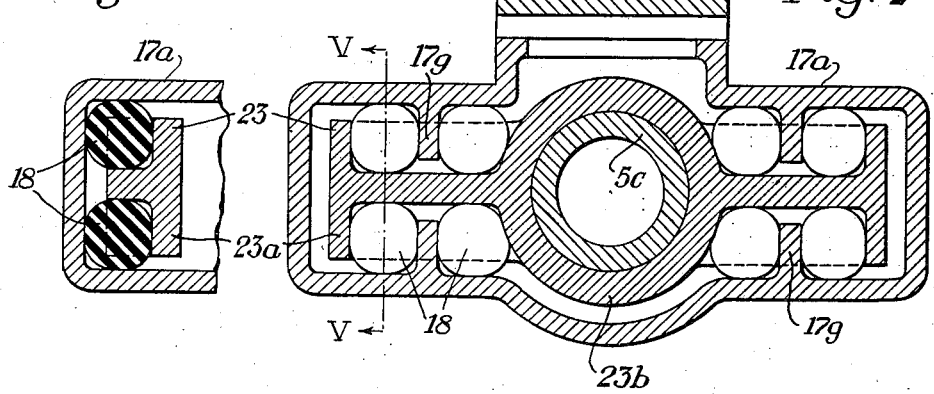
Figure 3:
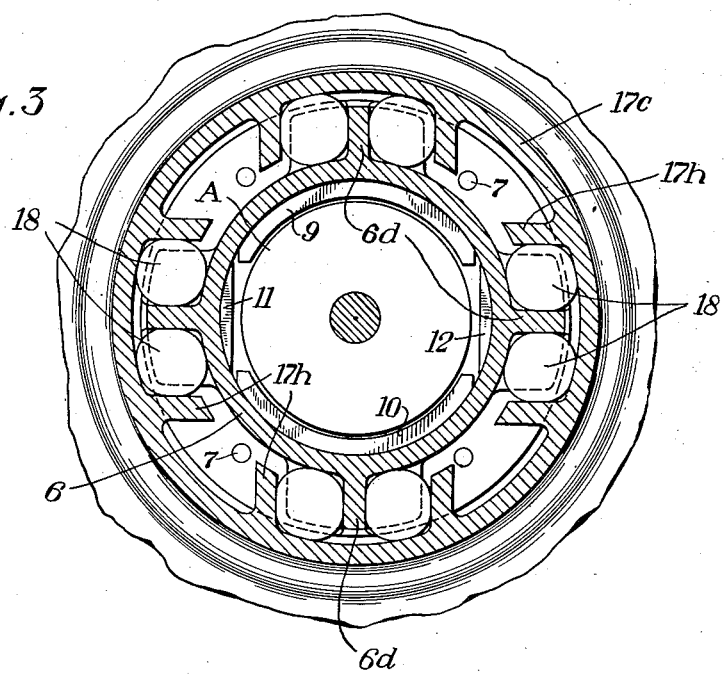
Figure 4:
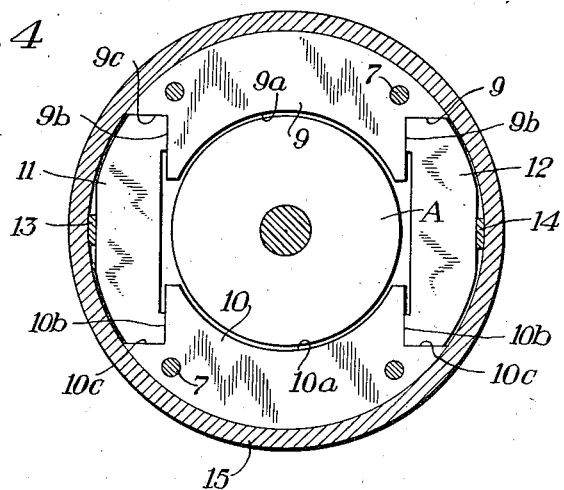

In the accompanying drawings, Fig. 1 is a vertical sectional view showing a generator operatively connected with a vehicle axle, the generator being mounted on the journal box at one end of the axle by mounting means which embodies my invention. Figs. 2, 3 and 4 are sectional views taken substantially on the lines II—II, III—III and IV—IV, respectively, of Fig. 1. Fig. 5 is a sectional view taken substantially on the line V—V of Fig. 2.

Similar reference characters refer to similar parts in each of the several views.

Referring to the drawings, the generator here shown comprises, as usual, an armature A and a field assembly F.

The armature A is of conventional construction, and is rotatably mounted in suitable anti-friction bearings 1 and 2 secured within bearing openings 3 and 4 formed in end bells 5 and 6 which are clamped against opposite sides of the field assembly by means of studs 7 or the like. The armature commutator 8 cooperates with suitable brushes which are also of conventional construction, and which have accordingly been omitted from the drawings since these brushes form no part of my present invention.

The field assembly of the generator consists of magnetizable pole pieces 9 and 10 (see Fig. 4), preferably of cold rolled steel, disposed between permanent magnets 11 and 12. The pole pieces are provided with curved pole faces 9a and 10a for cooperation with the generator armature, and with recesses 9b and 10b which form shoulders 9c and 10c. The recesses 9b and 10b cooperate with flat surfaces ground on the magnets to provide a good magnetic connection between the permanent magnets and the pole pieces, while the shoulders cooperate with the ends of the magnets to maintain the proper spacing between the pole pieces.

The magnets and pole pieces are disposed with a light press fit within a ring 15 of non-magnetic material, such as brass, and are held in place by the action of wedges 13 and 14 which are forced between the ring and flat surfaces ground on to the outer faces of the magnets. It will be seen that with this arrangement the brass ring 15 will be distorted slightly by the wedges to force the shoulders on the pole pieces against the ends of the permanent magnets, and the action of the wedges will force the magnets against the pole pieces, whereby the whole assembly is retained in its proper position. The correct position of the pole pieces and magnets lengthwise of the generator armature is maintained by the end bells 5 and 6 which are each formed with an annular recess 5a or 6a which receives the outer edge of the ring and with an annular shoulder 5b or 6b which abuts against the contiguous side of the pole pieces and the magnets.

In assembling the field assembly, the pole pieces and magnets are first pressed into the brass ring, after which the wedges are driven in and cut off even with the magnets. The end bells are then bolted to the field assembly by means of the previously referred to studs 7.

The generator is intended to be mounted on the journal box 29 of a car or locomotive in a position to be driven from one end of the associated axle 19, and to this end the generator is resiliently supported within an outer or supporting housing 17, by means of balls or spheres 18 of resilient material, such as rubber. The supporting housing 17 is constructed in two parts, the one part 17a of which is provided with an annular flange 17b, and the other part 17c of which is provided with a mating flange 17d. The flange 17b is formed with an annular recess 17e which receives an annular rib 17f on the other part 17d, whereby the two housing parts are maintained in concentric relation, and the two flanges are bolted by means of suitable bolts to the journal box 29 in a position concentric to the axle 19.

A set of the balls 18 is provided for each end of the generator, and the balls which position the generator at its outer end are disposed within cubical pockets formed by projections 17g provided on the inside of the part 17a of the outer housing 17 and cooperating with other projections 23a provided on a casting 23. The casting 23 has a central ring portion 23b which, as here shown, is pressed on to a circular end portion 5c machined on the end bell 5 of the generator, but the casting 23 may, if desired, be formed integrally with the end bell 5 or otherwise secured thereto as by welding or the like. If axial movement of the casting 23 relative to the end bell is prevented as by providing the end bell 5 with a shoulder 30, the casting 23 need not be tightly fastened to the end bell.

The balls at the inner end of the generator are likewise disposed in cubical pockets formed by projections 6d on the end bell 6 and other projections 17h on the outer housing part 17c, as best seen in Fig. 3.

The balls are preferably made of high quality rubber possessing long life and a high degree of resiliency, and are put in place in the pockets with a predetermined initial load which is low enough so that the rubber does not distort sufficiently to completely fill the pockets. Additional load on the balls, due for example to jars or shocks caused by vibration, the torque set up when the generator is under load, or the like, will cause the balls to distort, and under some conditions they may completely fill the pockets. When this happens, the load will be quite high and additional deformation of the balls will be practically impossible since no space is available into which the rubber can be forced. It will be seen, therefore, that the balls provide a high degree of resiliency at low load and rapidly increasing resistance to motion as the load increases.

It will also be seen that movement of the generator within the housing in any direction is resisted by the force exerted by the rubber balls. Forces applied in the direction of the generator axis are resisted by eight balls, while vertical and horizontal forces are each resisted by four balls. It will be obvious, however, that while I have shown the generator supported by 16 balls some of the balls could be omitted. In some conditions of loading it might be desirable to provide more resistance at the axle end of the generator than at the outer end and this action can be obtained by eliminating some of the balls at the outer end of the generator.

It is desirable to prevent oil spray from entering the outer housing 17, and to this end the housing may be closed at the end next to the axle by a diaphragm 20 of oil resisting material such as "Neoprene." This diaphragm is clamped at its outer edge to the outer housing part 17c by means of a ring 21, and at its inner end to the end bell 6 by means of a ring member 22, and is so designed that it may stretch in response to movement of the generator relative to the outer housing 17. It will be apparent that when one side of the diaphragm becomes stretched, the opposite side will tend to bulge, and member 22 is so designed that it will prevent the diaphragm from bulging to the extent that the drive mechanism might strike it. It will be seen that the diaphragm 20 provides an effective means to seal the outer housing against the entry of oil, dirt, grit or other foreign material.

The generator may be driven from the axle by any desired form of drive mechanism which will allow for the necessary relative movement between the generator and the axle caused by the movement which normally takes place between the axle and the journal box. As here illustrated, the drive mechanism comprises a plate 25 fastened to the axle and provided adjacent its outer end with a pin 26 which projects into a radial slot 27 provided in a disc 28 fastened to the outer end of the generator shaft. Sufficient clearance is provided between the pin and the slot to permit the necessary relative motion between the armature shaft and the axle. Drive mechanisms of this type are well known and further detailed description is believed to be unnecessary.

One advantage of mounting means involving my invention is that it requires a minimum amount of machining and utilizes parts which are otherwise inexpensive to manufacture so that the assembled mounting as a whole is relatively inexpensive.

Although I have herein shown and described only one form of mounting means embodying my invention, it is understood that various changes and modifications may be made therein within the scope of the appended claims without departing from the spirit and scope of my invention.

Having thus described my invention, what I claim is:

1. A mounting for resiliently securing a generator to the axle housing of a railway vehicle in axial alignment with one end of the vehicle axle, comprising a housing secured to the axle housing in concentric relation to the axle in the normal position of the latter and enclosing the generator with clearance, a casting secured to the outer end of the generator and provided with projections which cooperate with projections on said housing to form pockets substantially cubical in form, other projections formed on the generator at its inner end and cooperating with still other projections on said housing to form other pockets which are roughly cubical in form, and rubber balls disposed in said pockets under some initial compression which is insufficient to distort the balls to the point where they completely fill the pockets, said balls and pockets being arranged to resist movement of the generator in all directions from the position in which the generator shaft aligns axially with the axle.

2. A mounting for resiliently securing a generator to the axle housing of a railway vehicle in axial alignment with one end of the vehicle axle, comprising a housing secured to the axle housing in concentric relation to the axle in the normal position of the latter and enclosing the generator with clearance, a casting secured to the outer end of the generator and provided with projections which cooperate with projections on said housing to form pockets substantially cubical in form, other projections formed on the generator at its inner end and cooperating with still other projections on said housing to form other pockets which are roughly cubical in form, rubber balls disposed in said pockets under some initial compression which is insufficient to distort the balls to the point where they completely fill the pockets, said balls and pockets being arranged to resist movement of the generator in all directions from the position in which the generator shaft aligns axially with the axle, and resilient means for closing said housing at the axle end of the housing to prevent the entry of oil or other foreign substances.

3. A mounting for resiliently securing a generator to the axle housing of a railway vehicle in axial alignment with one end of the vehicle axle, comprising a housing secured to the axle housing in concentric relation to the axle in the normal position of the latter and enclosing the generator with clearance, a casting secured to the outer end of the generator and provided with projections which cooperate with projections on said housing to form pockets substantially cubical in form, other projections formed on the generator at its inner end and cooperating with still other projections on said housing to form other pockets which are roughly cubical in form, rubber balls disposed in said pockets under some initial compression which is insufficient to distort the balls to the point where they completely fill the pockets, said balls and pockets being arranged to resist movement of the generator in all directions from the position in which the generator shaft aligns axially with the axle, and a resilient diaphragm clamped to said housing and to said generator at the end adjacent the axle, said diaphragm being capable of stretching to permit relative movement between said generator and said housing.

JOHN W. LIVINGSTON.